Figure 1:
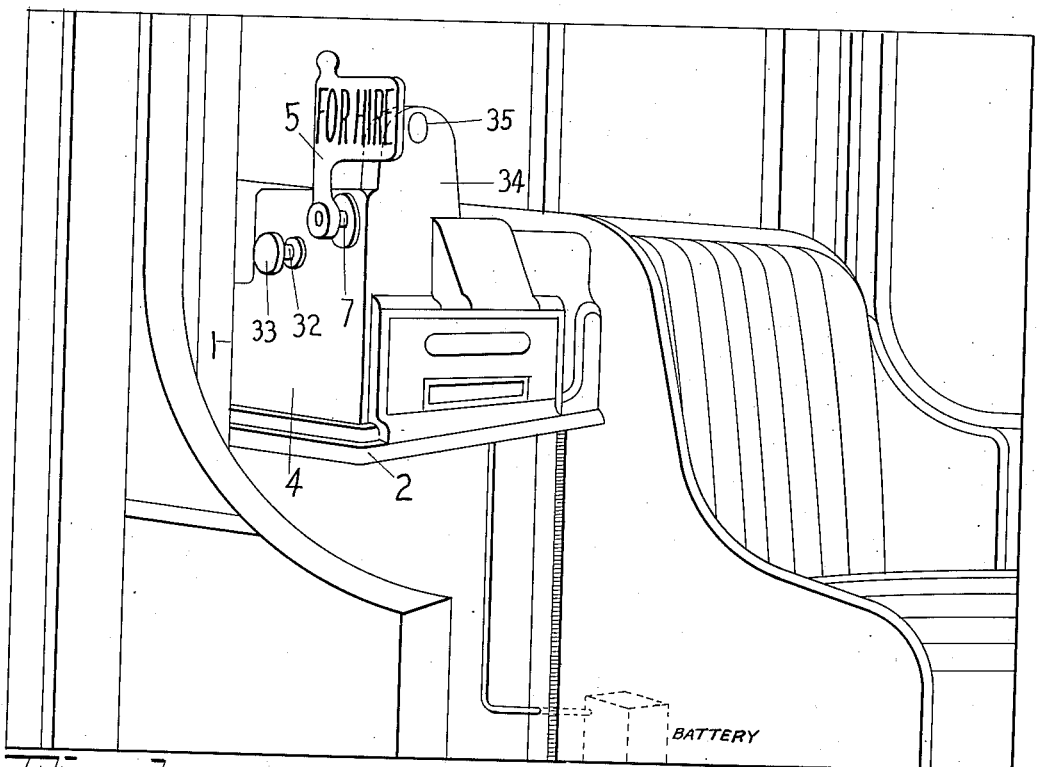

Dec. 15, 1925.

W. G. ORTH ET AL 1,566,038

INDICATING DEVICE FOR TAXIMETERS AND THE LIKE

Filed Feb. 11, 1924   2 Sheets-Sheet 1

INVENTORS.
WILLIAM G. ORTH, GEORGE H. DARST.

ATTORNEY.

Dec. 15, 1925.
W. G. ORTH ET AL
1,566,038
INDICATING DEVICE FOR TAXIMETERS AND THE LIKE
Filed Feb. 11, 1924
2 Sheets-Sheet 2
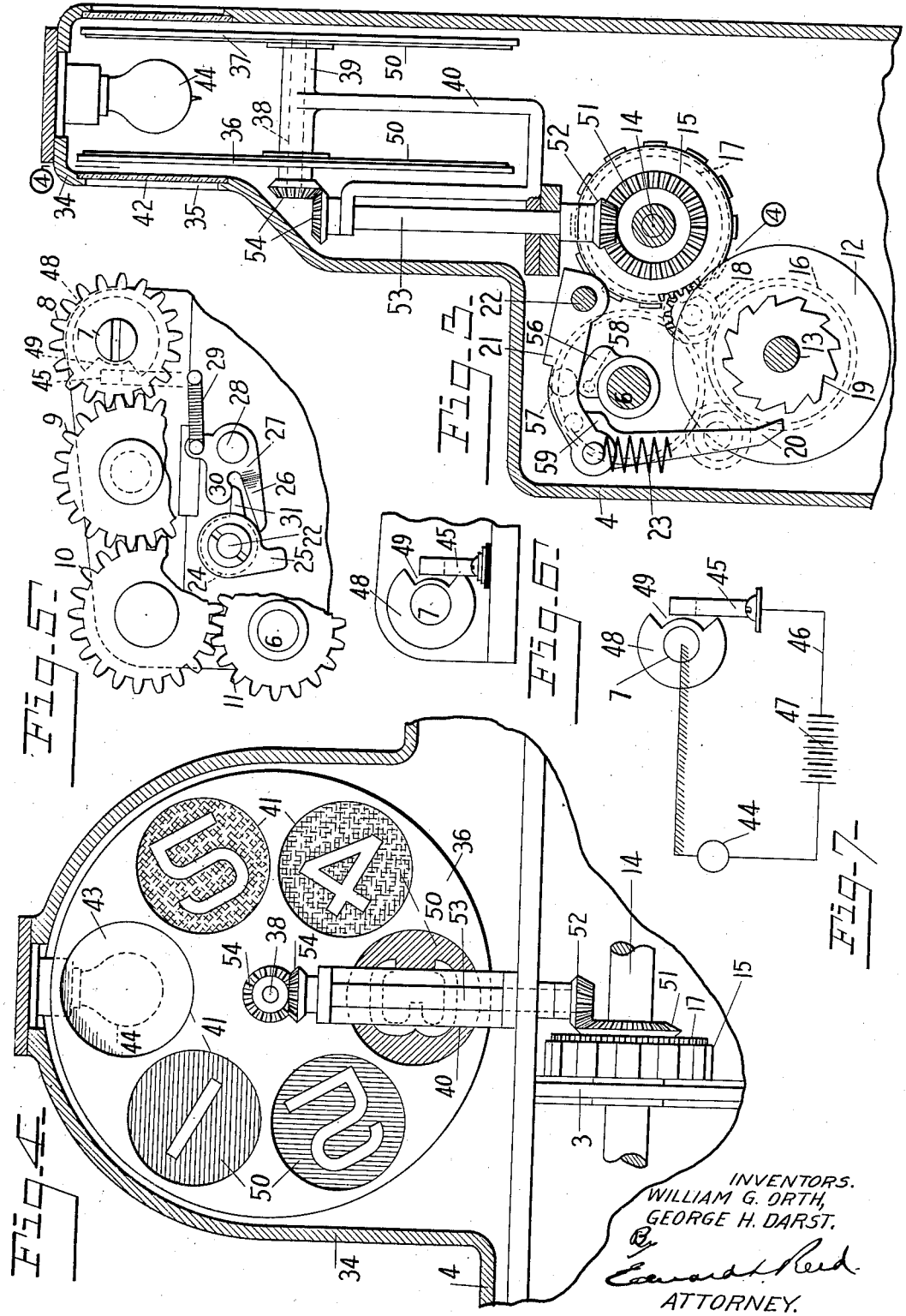
INVENTORS.
WILLIAM G. ORTH,
GEORGE H. DARST.
By
Edward L. Reed
ATTORNEY.

Patented Dec. 15, 1925.

1,566,038

UNITED STATES PATENT OFFICE.

WILLIAM G. ORTH AND GEORGE H. DARST, OF DAYTON, OHIO, ASSIGNORS TO OHMER FARE REGISTER COMPANY, OF DAYTON, OHIO.

INDICATING DEVICE FOR TAXIMETERS AND THE LIKE.

Application filed February 11, 1924. Serial No. 691,970.

*To all whom it may concern:*

Be it known that we, WILLIAM G. ORTH and GEORGE H. DARST, both citizens of the United States, residing at Dayton, in the county of Montgomery and State of Ohio, have invented certain new and useful Improvements in Indicating Devices for Taximeters and the like, of which the following is a specification, reference being had therein to the accompanying drawing.

This invention relates to indicating devices for taximeters and the like. The ordinary taximeter is provided with an exterior indicator or flag, the position of which indicates whether the cab is for hire or has been hired. The movement of this flag from one position to another controls the fare registering devices so that these devices are operative only when the flag is in its hired position. This flag is not readily visible at night and it is difficult for a prospective passenger or an inspector on the sidewalk to determine whether or not the flag of an approaching cab has been lowered, that is, moved to hired position. Further, taximeters are usually provided with "extras" registering devices for the purpose of registering charges for additional passengers, luggage and the like. These devices are necessarily manually operated and there is no means by which an inspector outside of the cab can determine whether or not the driver has registered on this extras registering device the charges which should have been made for extra passengers and luggage which he is carrying.

One object of the present invention is to provide an automatically controlled indicator which will be readily visible from a position outside of the cab to indicate the condition of registering devices within the taximeter.

A further object of the invention is to provide an illuminated indicator having a plurality of designations to indicate different conditions of the registering mechanism which will be mechanically operated through suitable connections with a register actuating device and the illumination of which will be controlled by the flag.

A further object of the invention is to provide an indicating device of this type which will be very simple in its construction and operation, inexpensive to produce and which may be easily controlled from the registering device or its operating mechanism.

Other objects of the invention will appear as the device is described in detail.

Figure 2:
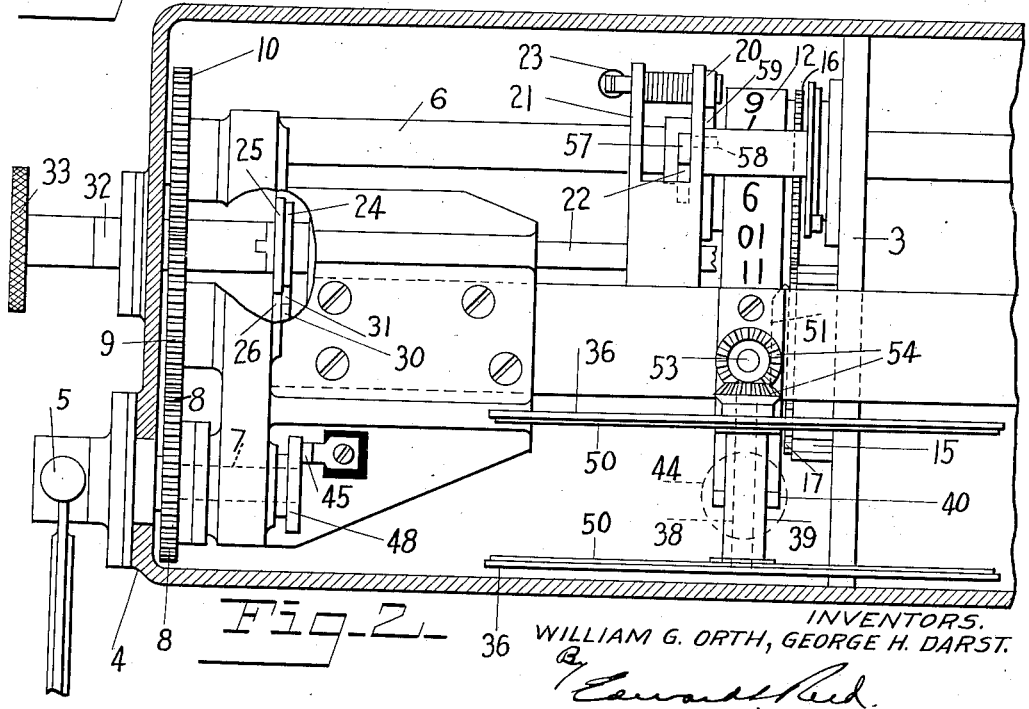

In the accompanying drawings Fig. 1 is a perspective of a taximeter embodying our invention, showing the same mounted on a taxicab; Fig. 2 is a plan view, partly broken away, of the extras registering device and the flag operating mechanism; Fig. 3 is a vertical sectional view showing the extras registering device and the indicator in elevation; Fig. 4 is a section taken on the line 4—4 of Fig. 3; Fig. 5 is a detail view of the flag operated gear train; Fig. 6 is a detail view of the flag controlled circuit breaker and closer; and Fig. 7 is a diagram of the circuit for the illuminating device.

In these drawings we have illustrated one embodiment of our invention and have shown the same as applied to a taximeter of well known construction which, in the present instance, is mounted on the bulkhead of a taxicab. It will be understood, however, that the mechanism may take various forms and that it may be applied to taximeters of various kinds without departing from the spirit of the invention.

The taximeter as a whole is shown at 1, in Fig. 1, and consists of a base 2 on which are mounted upwardly extending frame members 3, one only of which is here shown in Fig. 2. The frame members and the parts carried thereby are enclosed in a casing 4 which is mounted on and rigidly secured to the base 2. The fare registering devices are not here shown as they are not necessary to an understanding of the present invention but it will be understood that these may be of the usual, or any suitable, character and they preferably operate according to both time and distance to compute and register the fare. These registering devices are controlled in the usual manner by a flag 5 which is mounted exteriorly of the casing 4 for movement from its elevated or for hire position, as shown in Fig. 1, to a lowered position, which lowered position indicates that the cab is hired. The operation of the registering devices is controlled through a setting shaft 6 extending lengthwise of the taximeter and operated by the flag 5. In the present machine the flag is not mounted directly upon the shaft 6, as is sometimes the case, but is mounted near the opposite side of the taximeter on a stud shaft 7 journaled in and extending through the end wall of the casing 4. Secured to this shaft 7 is a gear 8 which is connected through gears 9 and 10 with a gear 11 rigidly secured to the setting shaft 6, whereby the movement of the flag is transmitted to the shaft 6.

The extras registering device may take any suitable form and may comprise either a visual indicator or a printing counter, or both. In the present instance, the taximeter is a recording taximeter and we have therefore provided the same with both a visual indicator and a printing counter. The visual indicator is shown at 12 with an indicator wheel mounted on a shaft 13 and carrying the indications on the periphery thereof. Arranged adjacent to the visual indicator and preferably mounted on a shaft 14, which extends parallel with the shaft 13, is the printing counter 15. The indicator 12 is provided with a gear 16 and the printing counter 15 is provided with a gear 17, the two gears being connected one to the other by a pinion 18, so that they will move in unison and corresponding designations thereon will be in indicating and printing positions simultaneously. This extras registering device is operated manually and, in the particular taximeter here illustrated, a pawl and rachet operating mechanism is employed. Rigidly secured to the visual indicator wheel 12 is a rachet wheel 19 with which cooperates a pawl 20 pivotally mounted at the free end of a lever 21 which is rigidly secured to a shaft 22. A spring 23 acts on the lever 21 to move the pawl 20 downwardly and thus cause it to actuate the ratchet wheel 19 and advance the extras registering device one step, that is, a distance corresponding to one unit of registration. The shaft 22 on which the pawl carrier or lever 21 is mounted has rotatably mounted thereon a hub 24 (Figs. 2 and 5) which is provided with a projection or cam finger 25. The cam finger 25 is arranged to engage one arm 26 of a two arm lever 27 which is pivotally mounted on a stud 28 and is held in its normal position by a spring 29. A second arm, 30, of the two arm lever, is arranged to engage a finger 31 rigidly secured to the shaft 22 so that when the arm 26 is moved downwardly by the cam the arm 30 will press the finger 31 downwardly and thereby rock the shaft 22 and elevate the pawl carrier 21 and pawl 20. As the cam continues its movement it will pass off the end of the arm 26, thereby releasing the shaft and permitting the pawl to be moved downwardly by the spring 23. Any suitable means may be provided for rotating the cam 25 and, as here shown, a shaft 32 extends through the end wall of the casing and is connected at its inner end with the hub 24, and is provided at its outer end with an actuating handle or knob 33. It will be apparent that each complete rotation of the knob 33 will cause the extras registering device to be advanced one step. The several parts of the taximeter mechanism above described are parts of a well known taximeter and do not form any part of the present invention except in so far as they enter into combination with the indicating devices and their controlling mechanism.

A single indicating device is provided for indicating both the position of the flag and the condition of the extras registering device, that is, for indicating whether any extras have been registered and if so how many. This indicator preferably consists of a casing having an opening in the wall thereof and within which is mounted a movable member having thereon a plurality of designations, and this member is operatively connected with the extras registering device so that the designation exposed through the sight opening will correspond to the position of the extras registering device and therefore indicate what, if any, registrations have been effected on the extras registering device. In the present device, the main casing 4 of the taximeter is provided with an upwardly extending portion 34 which forms in effect a separate casing and which is provided in both its front and rear walls with sight openings 35. Mounted within this casing 34 is a movable structure which carries the several designations. In the present construction, we have shown this movable structure as comprising two disks, 36 and 37, (Fig. 3) both rigidly mounted on a shaft 38 which is journaled in a suitable bearing 39 supported in the casing, between the disks 36 and 37, by a bracket 40. Each of the disks 36 and 37 is provided with a plurality of designations and, in the present instance, each disk has a plurality of openings 41 in which is located a disk of translucent material. The openings 41 in the two disks are so arranged that the corresponding openings will simultaneously aline with the openings 35 in the front and rear walls of the casing, these latter openings being closed by transparent material 42. It will be understood, of course, that a single disk or movable member 36 may be employed. The designations carried by the movable member of the indicator are such as to indicate both the position of the flag and the condition of the extras registering device. To this end the designation 43, which is so located on the movable member that it will be in line with the opening 35 when the registering device is in its zero or home position, consists simply of a disk of translucent material of a specified color such, for example, as white or yellow. Arranged within the casing 34 and, in the present construction, arranged between the two parts of the rotatable structure, is an electric lamp 44 which, when the circuit is closed through the same, will illuminate the translucent material and cause the same to be exposed to view through the sight opening 35. The circuit for this lamp is controlled by the flag in such a manner that when the flag is in its raised or for hire position the circuit will be broken and the indicator will not be illuminated. When the flag is pulled, that is, moved to its lowered position, the circuit will be closed through the lamp and the indicator illuminated. Consequently the illumination of the indicator indicates that the flag is in its lowered position and if the designation visible through the sight opening does not bear a figure or number it is obvious that, for reasons which will hereinafter appear, no registration has been effected on the extras registering device. The flag controlled circuit breaker and closer may take various forms but, as here shown, I have mounted on the frame of the taximeter a contact member 45 which is connected with one side of the circuit 46 (Fig. 7), leading to a battery 47 or other suitable source of current. The other side of the circuit is connected with a contact member 48 rigidly secured to the stud shaft 7 which carries the flag 5. This contact member is in the form of a disk a portion of which is cut away, as shown at 49, and the disk is so arranged that this cut away portion or space 49 will lie adjacent to the contact member 45 when the flag is in its raised position, thus interrupting the circuit. When the flag is pulled the body of the disk will engage the contact member 45 and close the circuit and this contact will be maintained in all positions of the flag until the latter is restored to its normal or elevated position.

The remaining openings 41 (Fig. 4) in the movable member of the indicator are also closed by disks of translucent material, as shown at 50. The translucent material in the various openings is preferably of different colors so that the position of the indicator may be determined by the color of the indication alone, but we have also, in the present instance, provided each of these designations with figures. The figures here shown run from 1 to 5, so that when any designation other than the first, the designation 43, is in line with the sight opening the number of registrations on the extras registering device will be indicated both by the color of the designation and by the figure which is exposed through the sight opening. The movable member of the indicator is operatively connected with the actuating device for the extras register so that the position of the movable member of the indicator will correspond to the position of the extras registering device. In the present instance, this connection is established through the printing counter 15 to which we have rigidly secured a beveled gear 51 with which meshes a beveled pinion 52 secured to the lower end of a shaft 53 the upper end of which is connected by beveled gearing 54 with the shaft 38 which carries the movable structure of the indicator. The ratio of this gearing is such that the movable structure will be advanced a space equal to the distance between the two designations each time the printing counter is advanced one step. Consequently when the first extra is registered the numeral 1 will be moved into indicating position on the indicator and when the second extra is registered the numeral 2 will be moved into indicating position, and so on. In the present instance, we have provided for the indication of five extras as it is not often that more than that many are registered but it will be obvious that any suitable number of indications may be provided.

The operation of the extras registering device is controlled by the flag, the arrangement being such that this registering device cannot be operated until the flag is lowered and consequently the indicating device cannot be moved until the flag is lowered. When the flag has been lowered the circuit will be closed through the lamp 44 and will remain closed until the flag is restored to its normal position, which in a machine of this type, can only be accomplished when the registering devices are reset to zero. The flag operated means for controlling the extras registering devices may take various forms and that here shown is the same as that used in taximeters of the type shown. It consists of a cam 56 rigidly mounted on the flag operated setting shaft which is arranged to engage a projection 57 on the pawl carrier 21. The arrangement of the cam 61 is such that when the flag is in its raised position the cam will engage the projection and move the pawl 20 out of engagement with the rachet wheel and lock the same against movement. When the flag is lowered the cam is moved out of the path of the projection 57 and the pawl carrier and pawl are free to operate. The pawl is prevented from engaging the rachet wheel and actuating the counter, when released by the lowering of flag, by means of a pin 58 secured to the cam 56 arranged to engage a projection 59 carried by the pawl, the arrangement being such that as the cam is moved from one position to another it will engage the projection, move the pawl to an inoperative position and hold it in that position until it has moved past the tooth on the rachet wheel. The pin on the cam will then be carried past the projection so that the pawl is free to move into engagement with the rachet wheel when actuated by its operating mechanism.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a mechanism of the character described, the combination with a registering device, means for actuating the same, and means other than said actuating means to control the operation of said registering device, of an indicator provided with a plurality of designations, means controlled by said controlling means for said registering device to illuminate a selected designation of said indicator, and means controlled by the actuating means for said registering device to select the designation which is to be illuminated.

2. In a mechanism of the character described, the combination with a registering device, means for actuating the same, and means other than said actuating means to control the operation of said registering device, of an indicator provided with a plurality of designations any one of which may be moved to indicating position, means controlled by the actuating means for said registering device to move a selected designation into indicating position, and means controlled by the controlling means for said registering device to illuminate that designation which is in indicating position.

3. In a mechanism of the character described, the combination with a registering device, means for actuating the same, and means other than said actuating means to control the operation of said registering device, of an indicator comprising a part having an opening, a movable part having a plurality of designations any one of which may be moved into line with said opening, an operative connection between said movable part and the actuating means for said registering device, and means controlled by said controlling means for said registering device to illuminate the designation which is in line with said opening.

4. In a mechanism of the character described, the combination with a registering device, means for actuating the same, and means other than said actuating means to control the operation of said registering device, of an indicator comprising a casing having a sight opening, an electric lamp mounted in said casing, a circuit for said lamp, a member mounted for movement between said lamp and said sight opening and having a plurality of translucent portions each of which constitutes a different designation, an operative connection between said movable member and the actuating means for said registering device, and means controlled by the controlling means for said registering device to make and break the circuit through said lamp.

5. In a mechanism of the character described, the combination with a registering device, means for actuating the same, and means other than said actuating means to control the operation of said registering device, of an indicator comprising a part having an opening, an electric lamp arranged in the rear of said part and spaced from said opening, a circuit for said lamp, a member rotatably mounted for movement between said lamp and said opening, said member having a plurality of translucent portions each constituting a different designation, an operative connection between said rotatable member and the actuating means for said registering device, and means controlled by the controlling means for said registering device to make and break the circuit through said lamp.

6. In a mechanism of the character described, the combination with a registering device, means for actuating the same, and means other than said actuating means to control the operation of said registering device, of an indicator comprising a part having a sight opening and a disk rotatably mounted adjacent to said part and having on the face thereof a plurality of designations arranged to be moved successively into line with said opening, and an operative connection between said disk and the operating means for said registering device.

7. In a mechanism of the character described, the combination with a registering device, means for actuating the same, and means other than said actuating means to control the operation of said registering device, of an indicator comprising a part having a sight opening and a disk rotatably mounted adjacent to said part and having on the face thereof a plurality of designations arranged to be moved successively into line with said openings, an operative connection between said disk and the operating means for said registering device, and means controlled by the controlling means for said registering device to illuminate that designation which is in line with said opening.

8. In a mechanism of the character described, the combination with a registering device, and means for actuating the same, of an indicator comprising a casing having a sight opening therein, and a part rotatably mounted within said casing and having on the face thereof a plurality of designations arranged to be moved successively into line with said sight opening, each of said designations being translucent, an operative connection between said rotatable part and said actuating means and means arranged in said casing to illuminate said translucent designations.

9. In a mechanism of the character described, the combination with a registering device, and means for actuating the same, of an indicator comprising a casing having slight openings in the opposite walls thereof, a pair of disks rotatably mounted within in said casing and each having a series of translucent portions adapted to be moved successively into line with the respective sight openings, the several translucent portions of each disk constituting different designations, an operative connection between said disks and the actuating means for said registering devices, and a lamp arranged between said disks in line with said sight openings.

10. In a mechanism of the character described, a registering device, actuating means therefor and a casing to enclose said registering device and said actuating means, said casing having an extension provided with a sight opening in the wall thereof, a shaft rotatably mounted in said casing and having driving connection with said registering device, a disk rigidly secured to said shaft and having a plurality of translucent portions adapted to be moved successively into line with said sight opening and each constituting a different designation, and a lamp mounted in said casing to illuminate that translucent portion of said disk which is in line with said opening.

11. In a taximeter, a registering device, actuating means therefor, a flag to control the operation of said registering device, a movable indicating member having a plurality of designations which are movable successively into indicating position, an operative connection between said movable member and said registering device, and means for illuminating that designation which is in indicating position.

12. In a taximeter, a registering device, actuating means therefor, a flag to control the operation of said registering device, a movable indicating member having a plurality of designations which are movable successively into indicating position, an operative connection between said movable member and said registering device, and means controlled by said flag for illuminating that designation which is in indicating position.

In testimony whereof, we affix our signatures hereto.

WILLIAM G. ORTH.
GEORGE H. DARST.